United States Patent [19]

Furusawa

[11] 4,280,117
[45] Jul. 21, 1981

[54] DIRECTION INDICATION APPARATUS FOR VEHICLES

[76] Inventor: Yoshikatsu Furusawa, No. 19, Aza Uwamichi, Kemanai, Towada-machi, Kazuno-shi Akita-ken, Japan

[21] Appl. No.: 55,168

[22] Filed: Jul. 6, 1979

[30] Foreign Application Priority Data

Aug. 11, 1978 [JP] Japan ................ 53-111084

[51] Int. Cl.³ .............................. B60Q 1/26
[52] U.S. Cl. ................... 340/81 R; 340/134
[58] Field of Search .............. 340/134, 80, 81 R

[56] References Cited
U.S. PATENT DOCUMENTS 4,109,171 8/1978 Furusawa ................ 340/134 X

*Primary Examiner*—Donald J. Yusko

[57] ABSTRACT

Direction indication apparatus for vehicles, which consists of; a power generation unit containing a miniature electric power generator which can be put into or taken out of operation by engaging or disengaging with the tire of the vehicle such as a bicycle etc., by manipulation through a Bowden wire; an electric flasher system for obtaining a flickering of the direction indication signal lamps disposed suitably on both sides of the vehicle; and a manipulation means for performing a direction indication operation which has a mechanism simultaneously effecting the operation of the power generation unit and junction of contacts for connection to either side of the indication signal lamp, by moving a manipulation knob forward or backward to cause engagement of the power generator with the tire and then tipping the knob to either side laterally to attain a supply of electric power to the indication signal lamp on the corresponding side.

17 Claims, 6 Drawing Figures

U.S. Patent    Jul. 21, 1981    Sheet 1 of 2    4,280,117
FIG.1
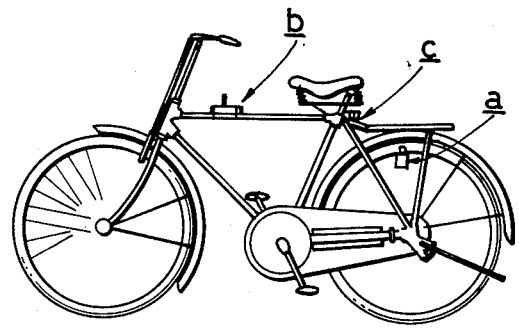
FIG.3
FIG.2
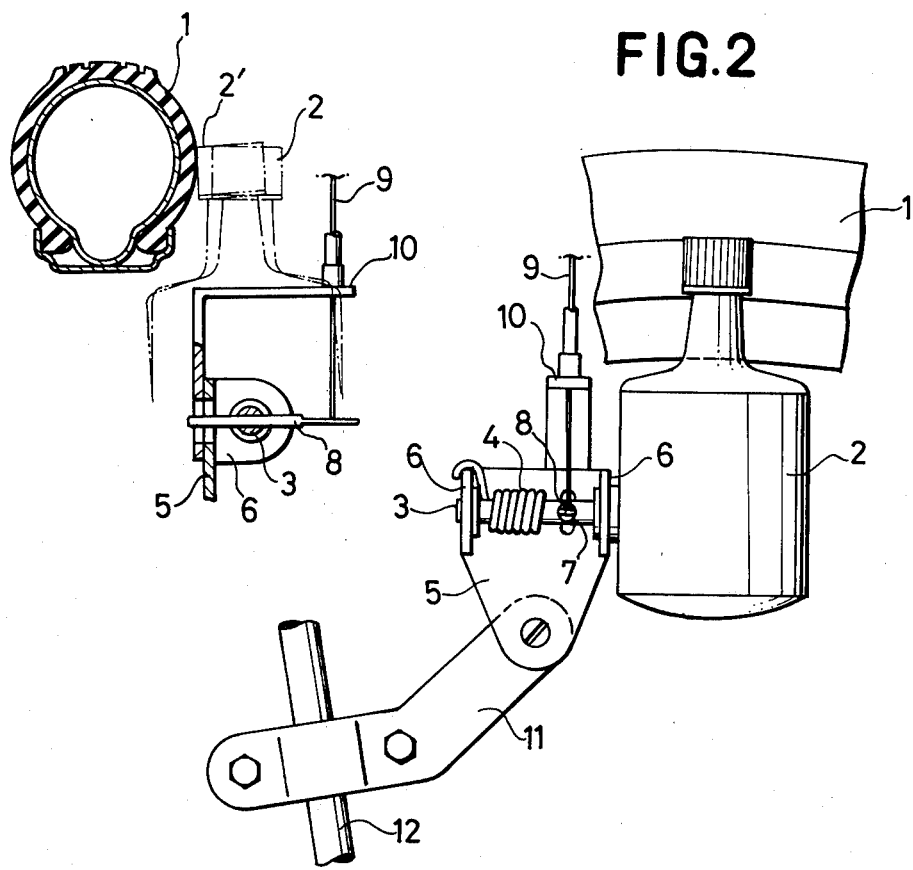

DIRECTION INDICATION APPARATUS FOR VEHICLES

BACKGROUND OF THE INVENTION

This invention relates to an apparatus for indicating the maneuvering direction, for use on vehicles, in particular, bicycles, power tillers etc.

According to U.S. Pat. No. 4,109,171, a direction indicating device for vehicles has been disclosed in which use of an electric power generator of which a rotor is contacted with a tire of the vehicle so as to be driven by same electric power is supplied simultaneously to the front and rear signal lamps disposed on either side of the vehicle, wherein rings having a shape of a half circular arc are attached to the tire constituted of rubber, so as to effect an intermittent operation of the power generator rotor to thereby cause flickering of the lamp. This device is claimed to have the effect of scraping off ice and mud sticking to the tire surface by taking advantage of the deformation of the rubber tire upon grounding, whereby the contact of the rotor onto the tire is improved.

The present invention proposes an apparatus in which, without employing such a measure as mentioned above, i.e. the affixing of rings onto the tire, the continuously generated electric power is automatically changed over alternately to the front and rear flasher lamps on either side of the vehicle by means of an electric mechanism. Thus, front and rear lamps are lit alternately in such a manner that either one is lit when the other is put out.

SUMMARY OF THE INVENTION

The direction indicating apparatus according to the present invention consists of a power generation unit (a) composed mainly of a miniature electric power generator of which a rotor can optionally be put into or taken out of engagement with the tire of the vehicle such as a bicycle, an electric flasher system (c) and a manipulation means (b) for direction indication connecting the mechanical construction of the power generation unit (a) with the electric circuit for direction indication in the flasher system.

The invention is characterized particularly in that the electric current obtained by the miniature power generator 2 engaged with the tire 1 is changed over alternately to either one of the front and rear signal lamps to cause flickering of the lamps alternately.

BRIEF DESCRIPTION OF THE DRAWINGS

FIG. 1 shows one embodiment of practical application of the direction indicating apparatus according to the invention adapted on a bicycle;

FIG. 2 is a front view of an example of a power generation unit (a)

FIG. 3 is a sectional view illustrating the function of the power generation unit (a).

DETAILED DESCRIPTION OF PREFERRED EMBODIMENTS

Figure 4:
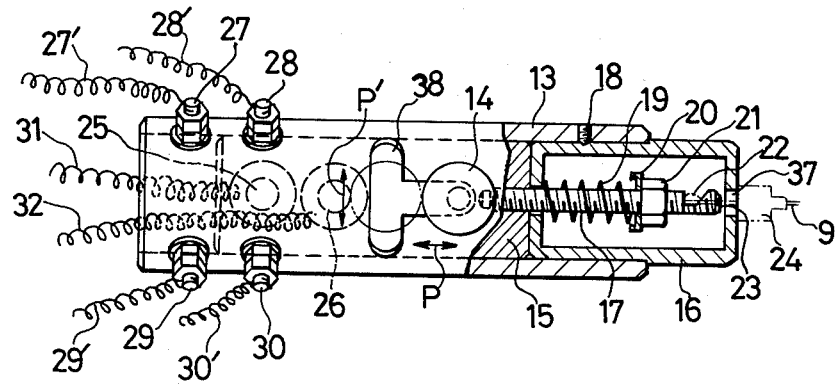
FIG. 4 is a partly cut-off plan view depicting the manipulation system (b) for direction indication.

In the following, the construction of each part of the direction indication apparatus according to the present invention is explained with reference to the preferred examples.

FIG. 1 illustrates one manner of practical application of the apparatus according to the present invention applied for a bicycle, in which the manipulation means for direction indication (b) is mounted on the upper pipe frame by a tightening band at a portion permitting easier manipulation and the flasher system (c) is contained in a cylindrical casing compactly and is mounted near the seat post and the power generation unit (a) is assembled on the rear fork frame through an adjusting arm, as indicated in FIG. 2.

Explaining now the power generation unit in detail, a mounting shaft 3 having thereon a spring 4 is arranged integrally with a miniature electric power generator 2, both ends of which are held rotatably on bearings 6 arranged at both sides of a mounting seat 5 for mounting the miniature generator. Through a hole 7 formed at a portion of the mounting shaft 3, a pin 8 is inserted, at one end of which is restrained an end of the spring 4 and at the other end of which is fixed a Bowden wire 9 for manipulating the miniature generator 2 so as to engage and disengage the rotor thereof with the side face of the tire 1. The receiving seat 10 for mounting the Bowden wire 9 is constructed integrally with the mounting seat 5 and has a function of supporting the Bowden wire 9 along its operation direction. The power generation unit is fixedly mounted through an adjusting arm 11 on the front or rear fork frame 12 at an adequate position. One of the spring 4, the other end of which is restrained to the pin 8, is fixed to the bearing flange 6.

In the direction indication manipulation means (b), a guide cylinder 13, which is a casing to be fixed to the bicycle body and is constituted by a hollow cylinder made of an insulating material, is provided thereon with two pairs of contact terminals of the form screw-fixed by nuts in two longitudinal rows standing at an adequate angle in the circumferential direction of its lateral section in such a manner, that right front and right rear contact terminals 27 and 28 in the right row correspond to the right front and right rear signal lamps, respectively, and left front and left rear contact terminals 29 and 30 to the left front and left rear signal lamps, respectively. In the central portion of the guide cylinder 13, there is formed a T-shaped cut-off slit 38. Inside the guide cylinder 13, a contact bar 15 is slidably arranged, on which a manipulation knob 14 is fixed from outside through the slit 38 by screwing same into slit 38. The manipulation knob thus performs restricted movements in longitudinal and lateral directions, as indicated in FIG. 4 by the arrows P and P', along the T-shaped slit 38. Here, the knob 14 holds its position by being restricted in the recess of the slit after it is freed by the driver of the vehicle. The contact bar 15 is provided thereon with front and rear contacts 25 and 26 in alignment, each being for connection with the front and rear signal lamps, respectively. The contact bar 15 is also provided at its rear end with a connection rod 17 fixed by screwing same into the bar. On the other end of the connection rod 17, one end of the Bowden wire 9 is fixed. At the rear end of the guide cylinder 13, a spring case 16 is arranged in such a manner, that it consists of two cylindrical parts, one of which has a smaller outer diameter than the other and is inserted in the guide cylinder so as to fit tightly therein, as shown in FIG. 4. The connection rod 17 is arranged to pass through the front end plate of the spring case 16. In the rear end plate of the spring case 16, there is formed a mounting hole 37 for mounting the support member 24 supporting the Bowden wire 9. The spring case 16 is fixed on the guide cylinder 13 using a fixing screw 18. On the connection rod 17 embedded in the contact bar 15, a spring 19 is arranged, of which one end is supported upon the inner face of the front side end plate of the spring case 16 and the other end is supported on a spring receiver 20 adjusted to be held at a suitable position by a nut 21. At the rear end of the connection rod 17, a cut-off notch 22 is formed so as to intersect the central bore 23, through which one terminal end of the Bowden wire 9 is passed and fixed by welding same onto the cut-off notch 22.

Figure 5:
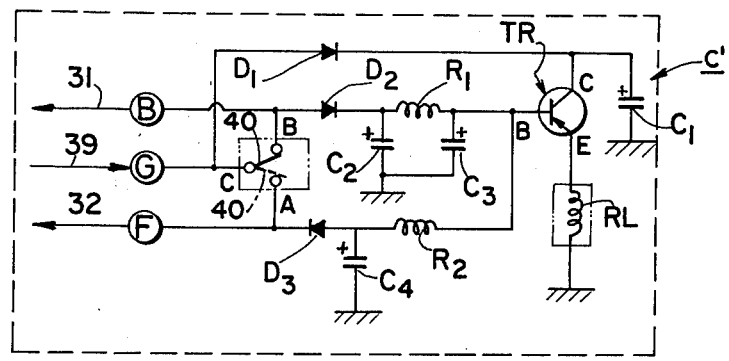
FIG. 5 indicates the electric circuit in the system (c)

FIG. 5 shows the circuit (c) for causing flickering of the lamps, in which terminals B and F are connected to the rear lead wire 32 and front lead wire 31, respectively. A lead wire 39 connected to the miniature electric power generator 2 is connected to terminal G. The circuit (c) is known and is used in, for example, Christmas decoration lights etc.

Figure 6:
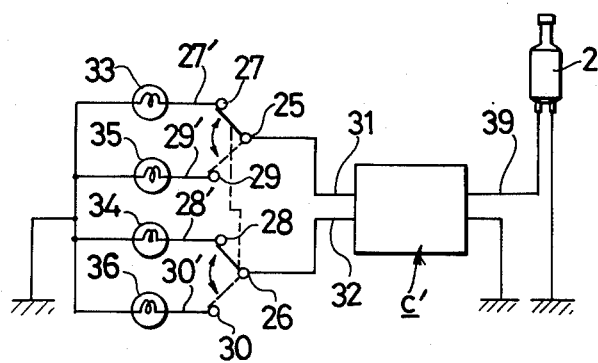
FIG. 6 shows the electric circuit for the direction indication.

FIG. 6 shows the electric circuit for direction indication according to the present invention.

Now, the actual manner of manipulation for direction indication will be explained with reference to FIG. 4, in which, direction is expressed in terms of the person getting on the bicycle shown in FIG. 1.

At the position indicated in FIG. 4, the manipulation knob 14 corresponds to the state, at which the miniature power generator 2 is disengaged from the tire 1. In order to produce an indication for turning left, the manipulation knob is pushed forward against the recoiling forces of the springs 14 and 4 (see FIG. 2) and then tipped left along the slit 38. By this procedure it is able to light the left side front and rear signal lamps in a flickering manner. Thus, upon forwarding the manipulation knob 14, the Bowden wire 9 is drawn therewith to effect the pin 8 to be moved upwards, so as to tilt the miniature power generator 2 around the mounting shaft 3 to the position 2' shown in FIG. 3 to thereby attain an engagement of the rotor thereof with the tire 1. When, in this state, the manipulation knob is tipped left, the front and rear contacts 25 and 26 arranged on the contact bar 15 will come in contact with the left side front and rear contact terminals 29 and 30 arranged in the guide cylinder 13, respectively. Here, the contacts take a position shown by the dotted line in FIG. 6, so that the electric power is supplied to the left front and left rear signal lamps 35 and 36 to light them flickeringly at an interval prescribed by traffic regulations. For the indication of turning right, the above procedure is followed except that the knob is tipped not left but right, to thereby put the right side front and rear signal lamps 33 and 34 into operation.

The transistor TR is provided for energizing the relay RL which causes the direction indication signal lamps 33, 34, 35 and 36 to go on and off. When the relay RL is not energized, the contact arm 40 is displaced so as to come in contact with the terminal B. When the generator 2 generates electric power the electric power is rectified by diodes $D_1$ and $D_2$ and flows from the terminal C to the lamp 33 through contact B and the contacts 25 and 27 in order to light the lamp 33. At the same time, the current flows through the diode $D_2$ to charge the capacitor $C_2$ and flows through the resistor $R_1$ to charge the capacitor $C_3$ and also flows to the base of the transistor TR in order to turn on the transistor TR so as to energize or operate the relay RL. When the contact arm 40 moves away from the terminal B and come in contact with the terminal A this current lights the lamp 34 through the contact 28. When the charge of the capacitor $C_3$ is discharged to light the lamp 34, the current does not flow to the base of the transistor TR to turn it off and therefore the contact arm 40 moves back to the terminal B from the terminal A. Thus, the current from the generator 2 ultimately flows to the front lamp 33 and the back lamp 34 due to the switching operation of the transistor TR to alternately light the lamps 33 and 34.

Thus, according to this invention, it is attainable to change over the electric current generated by the miniature power generator engaged with the tire alternately to the front or to the rear signal lamp so as to achieve flickering of the lights.

What we claim is:

1. Direction indication apparatus for a vehicle comprising a power generation unit containing a miniature electric power generator arranged so as to permit a rotor thereof to optionally engage or disengage with the tire of said vehicle, such as bicycle, by the drawing operation of a Bowden wire, an electric flasher system causing alternate flickering of direction indication signal lamps disposed suitably on both sides in front and rear of said vehicle so as to cause flickering to alternate between the front and rear signal lamps and a manipulation means for performing direction indication operation which has a mechanism simultaneously effecting the operation of said power generation unit and junction of contacts connected to either one side of said signal lamps in such a manner that, by moving a manipulation knob forward or backward along a T-shaped cut-off slit, engagement of said power generator with the tire is effected and by further tipping said manipulation knob on either one side or the other, switching to said signal lamps on the corresponding side of the vehicle is effected.

2. Direction indication apparatus for a vehicle comprising a power generation unit containing a miniature electric power generator arranged so as to permit a rotor thereof to optionally engage or disengage with a continuous and single plane surface of the tire of said vehicle such as bicycle, and electric flasher system causing alternate flickering of direction indication signal lamps suitably disposed on both sides in the front and rear of said vehicle and a manipulation means for performing direction indication operation which has a mechanism simultaneously effecting the operation of said power generation unit and junction of contacts connected to either one of said side signal lamps, so as to cause said power generator to engage or disengage with the tire and simultaneously, to effect the supply of electric power to either one of said side signal lamps.

3. Direction indication apparatus according to claim 2 wherein said miniature electric power generator in the power generation unit is permitted to engage or disengage with the tire of said vehicle by the drawing operation of a Bowden wire.

4. Direction indication apparatus according to claim 2 wherein said direction indication manipulation means have a mechanism for effecting engagement of said power generator with the tire by moving a manipulation nob forwards or backwards and to effect switching of either one of said side signal lamps by tipping said so-forwarded nob to the corresponding direction.

5. Direction indication apparatus according to claim 2 wherein said direction indication manipulation means has a mechanism, in which a T-shaped cut-off slit is provided and by moving said manipulation means along said slit forwards or backwards, engagement of said power generator is effected and by tipping said manipulation means further to either one side or the other, switching power to said signal lamp on the corresponding side of said vehicle is effected.

6. Direction indication apparatus according to claim 2 wherein said miniature electric power generator in the power generation unit is permitted to engage or disengage with the tire of said vehicle by the drawing operation of Bowden wire and wherein said direction indication manipulation means has a mechanism, in which a T-shaped cut-off slit is provided and by moving said manipulation means along said slit forwards or backwards, engagement of said power generation is effected and by tipping said manipulation means further to either one side or the other, switching power to said signal lamp on the corresponding side of said vehicle is effected.

7. Direction indication apparatus according to claim 2 wherein said direction indication manipulation means has a mechanism for effecting engagement of said power generator with the tire by moving a manipulation nob forwards or backwards and to effect switching of either one of said side signal lamps by tipping said so-forwarded nob to the corresponding direction, said direction indication manipulation means having a mechanism in which a T-shaped cut-off slit is provided and by moving said manipulation nob along said slit forwards or backwards, engagement of said power generator is effected and by tipping said manipulation nob further to either one side or the other switching power to said lamp on the corresponding side of said vehicle is effected.

8. Direction indication apparatus according to claim 2 wherein said miniature electric power generator in the power generation unit is permitted to engage or disengage with the tire of said vehicle by the drawing operation of a Bowden wire, said direction indication manipulation means having a mechanism for effecting engagement of said power generator with the tire by moving a manipulation nob forwards or backwards and to effect the switching of either one of said side signal lamps by tipping said so-forwarded nob to the corresponding direction, said direction indication manipulation means mechanism including a T-shaped cut-off slit whereby movement of said manipulation nob along said slit forwards or backwards effects engagement of said power generator and whereby tipping of said manipulation nob further to one side or the other effects switching power to said signal lamp on the corresponding side of said vehicle.

9. Direction indication apparatus for a vehicle comprising a power generation unit containing a miniature electric power generator arranged so as to permit a rotor thereof to optionally engage or disengage with the tire of said vehicle such as bicycle, the surface of said tire that is engaged by said rotor being in a single, continuous plane, an electric flasher system causing alternate flickering of direction indication signal lamps suitably disposed on both sides in the front and rear of said vehicle so as to cause the flickering to alternate between the front and rear signal lamps and a manipulation means for performing direction indication operation, provided with a mechanism simultaneously effecting operation of said power generation unit and junction of contacts connected to either one of said side signal lamps, so as to cause said power generator to engage or disengage with the tire and simultaneously and respectively to effect or interrupt the supply of electric power to either one of said side signal lamps.

10. Direction indication apparatus according to any of claim 9, wherein said miniature electric power generator in the power generation unit is permitted to engage or disengage with the tire of said vehicle by the drawing operation of a Bowden wire.

11. Direction indication apparatus according to any of claim 10, wherein said direction indication manipulation means has a mechanism for effecting engagement of said power generator with the tire by moving a manipulation knob forwards or backwards and to effect switching of either one of said side signal lamps by tipping said so-forwarded knob to the corresponding direction.

12. Direction indication apparatus according to any one of claim 11 wherein said direction indication manipulation means has a mechanism, in which a T-shaped cut-off slit is provided and by moving said manipulation knob along said slit forwards or backwards, engagement of said power generator is effected and by tipping said manipulation knob further to either one side or the other, switching power to said signal lamp on the corresponding side of said vehicle is effected.

13. Direction indication apparatus according to claim 4 wherein said direction indication manipulation means have a mechanism for effecting engagement of said power generator with the tire by moving a manipulation nob forwards or backwards and to effect switching of either one of said side signal lamps by tipping said so-forwarded nob to the corresponding direction.

14. Direction indication apparatus according to claim 9 wherein said miniature electric power generator in the power generation unit is permitted to engage or disengage with the tire of said vehicle by the drawing operation of a Bowden wire and wherein said direction indication manipulation means has a mechanism, in which a T-shaped cut-off slit is provided and by moving said manipulation means along said slit forwards or backwards, engagement of said power generator is effected and by tipping said manipulation means further to either one side or the other, switch power to said signal lamp on the corresponding side of said vehicle is effected.

15. Direction indication apparatus according to claim 9 wherein said direction indication manipulation means has a mechanism, in which a T-shaped cut-off slit is provided and by moving said manipulation means along said slit forwards or backwards engagement of said power generator is effected and by tipping said manipulation means further to either one side or the other, switching power to said signal lamp on the corresponding side of said vehicle is effected.

16. Direction indication apparatus according to claim 9 wherein said direction indication manipulation means has a mechanism for effecting engagement of said power generator with the tire by moving a manipulation nob forwards or backwards and to effect switching of either one of said side signal lamps by tipping said so-forwarded nob to the corresponding direction, said direction indication manipulation means having a mechanism, in which a T-shaped cut-off slit is provided and by moving said manipulation nob along said slit forwards or backwards, engagement of said power generator is effected and by tipping said manipulation nob further to either one side or the other, switching power to said signal lamp on the corresponding side of said vehicle is effected.

17. Direction indication apparatus according to claim 9 wherein said miniature electric power generator in the power generation unit is permitted to engage or disengage with the tire of said vehicle by the drawing operation of a Bowden wire, said direction indication manipulation means having a mechanism for effecting engagement of said power generator with the tire by moving a manipulation nob forwards or backwards and to effect the switching of either one of said side signal lamps by tipping said so-forwarded nob to the corresponding direction, said direction indication manipulation means mechanism including a T-shaped cut-off slit whereby movement of said manipulation nob along said slit forwards or backwards effects engagement of said power generator and whereby tipping of said manipulation nob further t one side or the other effects switching power to said signal lamp on the corresponding side of said vehicle.

* * * * *